3,315,009
POLYMERIZATION PROCESS
Robert M. Engelbrecht, St. Louis, James M. Schuck, Webster Groves, and Robert G. Schultz, Vinita Park, Mo., assignors to Monsanto Company, St. Louis, Mo., a corporation of Delaware
No Drawing. Filed July 12, 1963, Ser. No. 294,745
9 Claims. (Cl. 260—683.15)

The present invention relates to a process for the polymerization of olefin hydrocarbons. More particularly, the present invention relates to a process for polymerizing normally gaseous mono-olefin hydrocarbons to produce olefin polymers of 8 to 16 carbon atoms, which olefin polymers, when incorporated into alkylaromatic sulfonates as the alkyl substituent, produce alkylaromatic sulfonates of increased susceptibility to biological decomposition.

Among the most widely used of the synthetic detergents are the alkylaromatic sulfonates. Usually, these alkylaromatic sulfonate detergents derive their alkyl substituents from olefin hydrocarbons produced by the polymerization of lower molecular weight olefin hydrocarbons. Generally, the alkylaromatic sulfonates so produced possess relatively good functional properties from the detergent standpoint. However, these compounds are resistant to biological decomposition to such a degree that they are creating a substantial problem. Considerable amounts of detergent compound pass through sewage or waste disposal plants unchanged and when passed into lakes or streams are responsible for unsightly nuisances in the form of foam and scum and also represent potential toxicity hazards to aquatic life and to communities downstream.

Numerous catalysts and processes are available for the polymerization of olefin hydrocarbons to produce olefinic polymers of the proper molecular weight for inclusion in alkylaromatic sulfonates. However, few of these catalysts or processes have been found to produce olefin polymers which when alkylated into alkylaromatic sulfonates produce detergent compositions susceptible to biological decomposition.

It is an object of the present invention to provide a new and novel process for the polymerization of olefin hydrocarbons. Another object of the present invention is to provide a new and novel process for the polymerization of normally gaseous mono-olefin hydrocarbons. Yet, another object of the present invention is to provide a process for the polymerization of normally gaseous mono-olefin hydrocarbons to produce olefin polymers of 8 to 16 carbon atoms, which olefin polymers when incorporated into alkylaromatic sulfonates as the alkyl substituent produce alkylaromatic sulfonates of increased susceptibility to biological decomposition. Additional objects will become apparent from the following description of the invention herein disclosed.

The present invention, which fulfills these and other objects, comprises contacting in a first polymerization zone at a temperature of 0 to 200° C. and a pressure of atmospheric to 2500 p.s.i.g., normally gaseous mono-olefin hydrocarbons with an activated carbon supported cobalt oxide catalyst activated at a temperature of 200 to 350° C., to form a polymer fraction, separating said polymer fraction to obtain a fraction comprised of relatively linear dimers of the normally gaseous mono-olefin hydrocarbons, said dimers being of 4 to 8 carbon atoms, contacting said relatively linear dimer fraction in a second polymerization zone at a temperature of 50 to 250° C. and a pressure of atmospheric to 2500 p.s.i.g., with an activated carbon supported cobalt oxide catalyst activated at a temperature of 400 to 575° C. to form a second polymer fraction, separating said second polymer fraction to obtain a fraction comprised of relatively linear mono-olefin dimers of olefin hydrocarbons in the feed to the second polymerization zone, said dimers being of 8 to 16 carbon atoms. This relatively linear mono-olefin dimer fraction comprised of mono-olefin hydrocarbons of 8 to 16 carbon atoms, when reacted with an aromatic compound to form an alkylaromatic compound, produces an alkylaromatic compound of increased susceptibility to biological decomposition.

Though the above embodiment suggests the use of the relatively linear olefin dimer fraction of 8 to 16 carbon atoms in the alkylation of an aromatic compound for the ultimate production of an alkylaromatic sulfonate, the present invention is not to be so severely limited. This olefin fraction may be used in the preparation of any detergent composition which requires an alkyl substituent of 8 to 16 carbon atoms. For example, the olefin fraction is useful in the preparation of alkyl sulfonates in which the alkyl group is directly connected to the sulfonate radical or in which the alkyl group is connected to the sulfonate radical by an intermediate linkage such as an ester, ether, amide, or like groups. Also, this olefin fraction is useful in preparing alkylaromatic sulfonates in which the alkyl group is joined to the aromatic nucleus through intermediate linkages such as ester, ether, amide and like groups. This olefin fraction comprised of mono-olefin hydrocarbons of 8 to 16 carbon atoms produced by the present invention finds further utility in the preparation of alkanols and other like uses wherein relatively linear olefins are particularly useful.

The term "dimer" as used herein, refers to those polymers obtained by the condensation of two and only two molecules or monomer units of mono-olefinic hydrocarbons. These molecules or monomer units may be like or unlike. For example, dodecenes produced by the condensation of two hexene-1 molecules or the condensation of a butene-1 molecule and an octene-1 molecule are equally within the meaning of the term "dimer" as used herein.

For purposes of simplifying the description of the present invention, the polymerization of normally gaseous mono-olefin hydrocarbons, briefly described above, will be hereinafter referred to as the "first stage dimerization" and the dimer product obtained from this first stage dimerization as the "first stage dimer." The polymerization of the first stage dimer, also briefly described above, is hereinafter referred to as the "second stage dimerization" and the dimer product obtained from this second stage dimerization as the "second stage dimer."

The base supports useful in the catalysts used in both the first and second stage dimerizations are activated carbons. These activated carbons may be any porous carbon known to be useful for catalyst preparation. The activated carbons generally have surface areas of about 400 to 2000 square meters per gram and may be in the form of compact masses, granules, chips, powders, etc. Suitable supports include coconut charcoal, wood charcoal, carbon derived from coke, soft bone charcoal, hard bone charcoal, and the like. The activated carbon may be obtained from animal, vegetable or petroleum sources and may include such commercial materials as Pittsburgh "BPL," "CAL," "OL," and "SGL" produced by Pittsburgh Coke and Chemical Co., Girdler "G-32-C," and "G-32-E" produced by Chemical Products Division, Chemetron Corp., and Barnebey-Cheney Company's "EE-1" and "E-H-1."

In preparing the activated carbon supported cobalt oxide dimerization catalysts for both the first and second stage dimerizations, an activated carbon is impregnated with a solution of a cobalt salt and the salt subsequently converted to the oxide. This treatment of the activated carbon may be carried out by immersion of the carbon in the cobalt salt solution, by just moistening the carbon with the cobalt salt solution or by any other means known to those skilled in the art for impregnation of catalyst supports. The cobalt salt solution consists of a cobalt salt dissolved in any suitable solvent for the cobalt salt. Generally, wherever practical, aqueous or alcoholic solutions of the cobalt salt are used. Among the cobalt salts useful for impregnation of the activated carbon are the following non-limiting examples: Cobalt acetate, cobalt sulfate, cobalt nitrate, cobalt butanoate, cobalt pentanoate, cobalt hexanoate, cobalt chromate, cobalt vanadate, cobalt molybdate, cobalt iodate, cobalt oxalate, cobalt citrate, cobalt sulfite and the like. The most useful cobalt salts are cobalt acetate, cobalt sulfate and cobalt nitrate in the cobaltous form with cobalt nitrate being the preferred salt. The cobalt salt solution is preferably an aqueous solution having a concentration calculated to give the desired amount of cobalt oxide on the activated carbon after activation of the catalyst.

Prior to treatment of the activated carbon with a cobalt salt solution, the activated carbon may be acid washed or base treated or both prior to impregnation with a cobalt salt. If the activated carbon is to be acid washed, aqueous nitric acid will most often be used as the acid. This aqueous nitric acid is preferably used in an amount of approximately 1 to 2 volumes of acid per volume of activated carbon. Generally, when using an acid wash, it is preferred that the acid be one of a concentration of 10 to 30% in water. If a base treatment is also desired, it may be carried out through the use of such liquids as ammonium hydroxide and the like.

Though not necessary, it generally is desirable to have the activated carbon dry before it is treated with the cobalt salt solution. A particularly useful, but by no means limiting manner of drying the activated carbon, comprises heating the activated carbon at a temperature of 50 to 200° C. for 2 to 24 hours. A preferred method of drying the activated carbon comprises maintaining the carbon at a temperature of 100 to 150° C. for 2 to 6 hours. To facilitate drying, reduced pressures may be used. Of course, reduced pressures will shorten the drying period and/or lower the temperatures.

After the activated carbon has been impregnated with the cobalt salt solution, the impregnated activated carbon is generally subjected to a drying treatment. This drying treatment is carried out in the manner described in the preceding paragraph. It is not absolutely necessary that the catalyst be completely dried prior to activation. However, caution should be exercised in activating a catalyst which has not been subjected to at least partial drying. The drying step after impregnation brings about decomposition of the cobalt salt. Thus, if the catalyst has not been subjected to drying, there is a distinct possibility of over rapid decomposition resulting in an explosion when the catalyst is directly subjected to activation.

The most critical feature in the preparation of the activated carbon supported cobalt oxide catalysts of the present invention is in the activation conditions of the catalysts. The catalyst which is used in the first stage dimerization, generally, is activated at a temperature of 200 to 350° C. The preferred activation temperature for this first stage dimerization catalyst is 225 to 300° C. Activation of the activated carbon supported cobalt oxide catalyst used in the second stage dimerization is most often carried out at temperatures within the range of 400 to 575° C. with temperatures of 425 to 525° being preferred. Generally, a period of 0.25 to 3 hours is sufficient for complete activation of the catalyst, whether it is the first or second stage dimerization catalyst. The catalyst activation is carried out in the presence of an inert atmosphere. Several non-limiting examples of inert atmospheres in which the catalysts may be activated are nitrogen, carbon dioxide, propane, helium, argon, and the like. As a practical matter, nitrogen usually is preferred as the inert atmosphere. Activation may be carried out at slightly reduced pressures if desired. When reduced pressures are used, it is preferred from a practical standpoint that the pressure not be reduced below 10 mm. Hg, though lower pressures may be used.

Another factor of some importance in the dimerization catalysts, both for the first and second stage dimerizations, is the amount of cobalt, present as cobalt oxide, on the finished catalyst. The first stage dimerization catalyst usually contains from 2 to 30 percent by weight of cobalt, as cobalt oxide. With this first stage dimerization catalyst, however, optimum results are obtained with cobalt concentrations toward the lower end of this range. Therefore, lower concentrations of cobalt, as cobalt oxide, are preferred, these lower concentrations being within the range of 8 to 15 percent by weight of cobalt, as cobalt oxide. With the second stage dimerization catalyst, it has been found that there is a less apparent criticality in the concentration of cobalt present in the catalyst. However, there seems to be some benefit in using higher concentrations of cobalt, as an oxide, in the second stage dimerization. Therefore, though the second stage dimerization catalyst may contain 2 to 50 percent by weight and higher of cobalt, as an oxide, it is generally preferable to use a second stage dimerization catalyst having a cobalt concentration, as an oxide, within the range of 5 to 30 percent by weight of the total catalyst. Preferably, for optimum dimerization activity, the cobalt, as cobalt oxide, is present in the second stage dimerization catalyst in an amount equivalent to 12 to 30 percent by weight of the finished catalyst.

The first stage dimerization step of the present process dimerizes normally gaseous mono-olefin hydrocarbons. The normally gaseous mono-olefin hydrocarbons are ethylene, propylene and butylenes. The feed to the first stage dimerization may contain only one of these mono-olefins or it may contain a mixture of two or more. When two or more of these mono-olefins are present both dimerization and co-dimerization will take place. For example, if the feed comprises ethylene and propylene, then ethylene dimers of 4 carbons and propylene dimers of 6 carbon atoms will be formed as well as will be formed ethylene-propylene co-dimers of 5 carbon atoms. If the normally gaseous mono-olefin feed includes butylenes, it is usually preferred that the butylenes be n-butylenes. Further, it is preferred that the n-butylene be terminally unsaturated. The preferred feed to the first stage dimerization is propylene. Though it is generally preferred to have a relatively pure normally gaseous mono-olefin hydrocarbon feed to the first stage dimerization, it is not altogether necessary. The feed may contain small amounts of mono-olefins other than the normally gaseous mono-olefins. However, since the primary purpose of the first stage dimerization is to produce dimers of 4 to 8 carbon atoms, the amount of other polymerizable mono-olefins present in the feed should be kept to a minimum. The presence of diolefins and triolefins as well as acetylenic compounds in the feed is to be avoided since these materials poison the catalyst to some extent. Preferably, the feed will contain no greater than approximately 0.002% by weight of polyolefins. Saturated hydrocarbons as well as other inert materials may be present in the feed to a considerable extent. Such materials have no deleterious effect on the dimerization reaction. However, as a practical matter, large quantities of these materials are to be avoided since they are merely "dead weight" to the process and needlessly increase the cost of handling the feed materials and products.

The feeds to the second stage dimerization reaction are the relatively linear mono-olefinic dimer products of the first stage dimerization. These dimer products are of 4 to 8 carbon atoms depending upon the normally gaseous mono-olefin hydrocarbons in the feed to the first stage dimerization. If the preferred normally gaseous mono-olefin hydrocarbon, propylene, is the feed to the first stage dimerization, then the dimer feed to the second stage dimerization is ordinarily of 6 carbon atoms. It is preferred that the dimer feed to the second stage dimerization be substantially linear mono-olefin hydrocarbons. However, the presence of branched-chain mono-olefins up to a concentration of 15% by weight of the feed to the second stage dimerization is not deleterious to the present invention. A particularly preferred mono-olefin dimer feed to the second stage dimerization is one which contains no greater than 10% by weight of branched-chain mono-olefin hydrocarbons with the remainder of the mono-olefins being straight-chain. The mono-olefin hydrocarbons in the feed to the second stage dimerization include both internally and terminally unsaturated mono-olefin hydrocarbons. Since the feed to the second stage dimerization is a product of the first stage dimerization, there will generally be fewer impurities such as diolefins, triolefins, saturated hydrocarbons, inert materials and the like than are in the feed to the first stage dimerization. Further, since in most instances the product from the first stage dimerization is subjected to a separation step to recover the dimers produced and to exclude excess branched-chain mono-olefins, most of the impurities such as those above mentioned may, if present, also be removed during this separation step.

The separation step used for purifying the product of the first stage dimerization to meet the above discussed feed requirements of the second stage dimerization may be carried out by any conventional means. Generally, ordinary fractional distillation will be adequate for effecting the purification of the dimer product of the first stage dimerization. The determination of the precise fractionation equipment and conditions for obtaining the second stage dimerization feed, is well within the ability of those skilled in the art having the above definition of this feed before them. When the preferred feed, propylene, is dimerized in the first stage dimerization, fractionation of the dimer product to obtain an overhead fraction having a boiling range of approximately 60 to 75° C. will usually provide a suitable feed for the second stage dimerization. In addition to or in place of fractional distillation, other conventional separation or purification means such as adsorbents, i.e., molecular sieves, solvent extraction, extractive distillation, selective polymerization, isomerization and the like may be employed to conform the dimer product of the first stage dimerization to the feed requirements of the second stage dimerization. To repeat, it is immaterial to the present invention what separation means is used for purifying the product of the first stage dimerization to meet the feed requirements of the second stage dimerization, so long as such separation means provides the desired purification.

One of the primary advantages found in the herein disclosed first stage dimerization process is found in its production of relatively large quantities of dimers meeting the above defined feed requirements to the second stage dimerization. The amount of second stage dimerization feed-stock produced by the first stage dimerization is significantly improved over other conventional processes. To meet the above defined second stage feed requirements, it is generally necessary to remove a portion of the branched-chain dimers by such means as fractionation. Many of the isomeric branched-chain dimers are exceptionally difficult to separate from the straight-chain dimers by ordinary separation means such as fractionation. The first stage dimerization process of the present invention produces significantly less of these difficultly separable branched-chain isomers than do other known polymerization processes.

In carrying out the first stage dimerization, temperatures within the range of 0 to 200° C. are generally used. Preferably, however, the temperatures are within the range of 50 to 150° C. The temperatures of the second stage dimerization overlap those of the first stage dimerization, but are usually somewhat higher. The most useful temperatures for the second stage dimerization are within the range of from approximately 50 to 250° C. However, second stage dimerization temperatures of 100 to 175° C. are preferred. Dimerization pressures in both the first and second stage dimerizations usually are within the range of from approximately atmospheric pressure to 2500 p.s.i.g. and higher. Preferably, however, the first stage dimerization pressures will be within the range of from 50 to 750 p.s.i.g. with pressures of 100 to 500 being still more preferred. Pressures for the second stage dimerization will usually be somewhat lower and most often will be within the range of from approximately 10 to 400 p.s.i.g. with pressures of 100 to 300 p.s.i.g. being preferred.

Both the first and second stage dimerizations may be carried out batchwise or as a continuous process. As a practical matter, the dimerization reactions most often will be carried out as continuous processes with the feed material passed continuously over an activated carbon supported cobalt oxide catalyst bed and the dimer continuously recovered as effluent from the catalyst bed. The space velocity of the feed material in the catalyst zone usually is within the range of 0.1 to 50 liquid volumes of feed per hour per volume of catalyst. Preferred space velocities for the first stage dimerization reaction are within the range of from 1 to 50 liquid volumes of feed per hour per volume of catalyst. The preferred space velocities for the second stage dimerization reaction are within the range of from 0.1 to 5 liquid volumes of feed per hour per volume of catalyst.

The polymer product obtained from the second stage dimerization is comprised of dimers of the feed monoolefins and also some higher molecular weight polymers. This polymer product is subjected to fractional distillation or to some other separation means to recover the total dimer fraction from the unpolymerized feed material and the polymers of higher molecular weight than dimers, i.e., trimers, tetramers, etc. The dimer product of this second stage dimerization is relatively linear in character, generally containing 90 to 95% by weight of dimers which are straight-chained or branched-chain containing a single substituent. Upon hydrogenation these dimers have the general saturated formula

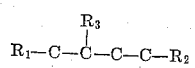

wherein the total number of carbon atoms is 8 to 16 and wherein $R_1$ and $R_2$ may be hydrogen or a n-alkyl hydrocarbon group of 4 to 12 carbon atoms and $R_3$ may be hydrogen or a n-alkyl hydrocarbon group selected from the group consisting of methyl, ethyl and propyl. The particularly preferred dimer product of the second stage dimerization is one in which the dimers are of 12 carbon atoms and which is comprised of 15 to 55% by weight of methyl undecenes and 25 to 85% by weight of n-dodecenes. This preferred product is generally obtained by using propylene as the feed to the first stage dimerization and then recovering from the first stage dimerization product the hereinabove discussed and defined preferred feed to the second stage dimerization.

One of the primary advantages of the present invention is that the total dimer product of the second stage dimerization is relatively linear and as such may be used in total without additional separation steps in the preparation of alkyl aromatic sulfonates which are substantially biodegradable. Also, this second stage dimer fraction finds utility in many other uses requiring relatively linear monoolefins.

The method whereby the product obtained from the second stage dimerization is separated to obtain the dimer fraction, is not critical to the present invention. Practically any method of separation may be used. It is only necessary that the separation means be such as to separate the relatively linear dimer fraction from the unpolymerized olefins of the feed and the polymers higher in molecular weight than the dimers.

In order to further describe and to illustrate the present invention, the following examples are presented. These examples are in no way to be construed as limiting the present invention.

*Example I*

Approximately 86.5 grams of a commercial grade (BPL) activated carbon was immersed in approximately 52.4 grams of cobalt nitrate hexahydrate dissolved in 90 mls. of demineralized water. Excess water was removed and the impregnated carbon dried at a low heat for approximately 2 hours until there was no visible liquid on the catalyst mass. The catalyst was then placed under vacuum at 125° C. for 16 hours and then activated in the presence of nitrogen at 35 mm. Hg and a temperature of 275° C. for 2 hours. The amount of cobalt, as an oxide, present in this catalyst was approximately 13.5% by weight of the catalyst.

Approximately 27 grams of the above prepared catalyst was placed in an one inch diameter stainless steel cylinder four inches in length. A propylene stream comprised of 83 weight percent propylene and 17 weight percent propane was then passed through the catalyst bed at a space velocity of 1.4 grams of feed per gram of catalyst per hour. The catalyst bed was maintained at a temperature of approximately 50° C. and a pressure of 720 p.s.i.g. The product was collected and subjected to fractionation to obtain a dimer fraction having a boiling range of 61 to 75° C. This dimer fraction represented 50% by weight of the polymer product and had the following composition:

| Component: | Weight percent |
| --- | --- |
| Hexene-1 | 10 |
| Trans-hexene-3 | 8 |
| Cis-hexene-3 | 2 |
| Trans-hexene-2 | 52 |
| Cis-hexene-2 | 21 |
| 2-methylpentene-1 | 6 |
| 2-methylpentene-2 | 1 |

This first stage dimer fraction represents the feed stock to the second stage dimerization.

A second catalyst was prepared in the same manner as that described above with the exception that the catalyst was activated at a temperature of approximately 475° C. and in the presence of nitrogen for 3 hours. The amount of cobalt, as an oxide present in the catalyst, was approximately 13.5% by weight of the total catalyst.

Approximately 80 grams of this catalyst were placed in a cylindrical reactor of the same dimensions as described above. Approximately 79 grams of the fraction whose composition is set out above was passed through this catalyst bed at a rate of 120 mls. per hour. The catalyst bed was maintained at a temperature of approximately 150° C. and at a pressure of approximately 300 p.s.i.g. The product was subjected to distillation and a dimer fraction having a boiling range of 38 to 100° C. at 30 mm. Hg was obtained. This dimer fraction represented 90% by weight of the polymer product and had the following composition:

| Component: | Weight percent |
| --- | --- |
| n-Dodecenes | 29.9 |
| Methyl undecenes | 43.1 |
| Ethyl decenes | 27.0 |

In order to demonstrate the efficacy of the present invention, the relatively linear dimer fraction prepared in the second stage dimerization in the above example was used for the alkylation of benzene which was subsequently sulfonated to an alkylbenzene sulfonate. The alkylbenzene sulfonate was then tested for its biodegradability by comparison with an extensively used conventional alkylbenzene sulfonate which is one in which the alkyl substituent is derived from the tetramerization of propylene over a phosphoric acid catalyst by the process disclosed in U.S. Patent No. 2,075,433.

Alkylation was carried out by placing approximately 175.5 grams of dry benzene in a cylindrical glass reactor equipped with a cooling coil thermometer well and means for agitation. Next, anhydrous hydrogen chloride was bubbled into the reactor for approximately 7 minutes. To this mixture was added approximately 3.2 grams of anhydrous aluminum chloride. Next, approximately 100 grams of the above described $C_{12}$ dimer fraction was added over a period of 15 minutes to the benzene catalyst mixture. Continuous agitation was maintained throughout the addition of the olefin material and the temperature was maintained between 30 to 35° C. throughout this period. After completion of the addition of the olefin, the reaction mass was allowed to age for approximately 15 minutes. The alkylation mass was then allowed to settle without agitation for one hour and the lower catalyst complex layer separated from the reaction mass. The remaining alkylated liquor was then washed with an equal volume of tap water.

Approximately 259 grams of the washed alkylated liquor was distilled batchwise through a ½ inch diameter packed column 12 inches in height. Benzene was recovered at atmospheric pressure at a 1:1 reflux ratio from the distillation. After removal of the benzene, the distillation was continued under reduced pressure. The alkylbenzene product cut was obtained within the boiling range of 123° C. to 135° C. at 2 mm. Hg. Approximately 83.7 grams of alkylbenzene was recovered.

Approximately 75 grams of the distilled alkylbenzenes were charged to a 250 ml. flask. To this was added approximately 105 grams of 20% oleum. The oleum was added over a 6-minute period while maintaining vigorous agitation and while maintaining a temperature of 50±3° C. After the addition of the oleum was complete the temperature was lowered to 40±3° C. and held for approximately 45 minutes. To this mixture was then added approximately 16.5 mls. of distilled water at such a rate that the temperature of the mixture could be held below 65° C. After the water was added, addition was stopped and the sulfonation mass transferred to a centrifuge tube and centrifuged for 30 minutes. The lower spent acid layer was separated and the sulfonic acid layer dissolved in 750 mls. of 80% isopropanol. The solution was then neutralized to a pH of 7.0 to 9.0 with a 25% sodium hydroxide solution. The resultant mixture was filtered to remove solid $Na_2SO_4$ and the remaining solution dried to obtain alkylbenzene sulfonate.

To test the alkylbenzene sulfonate so prepared for its biodegradability, two tests were used. The first of these tests was "activated sludge test." The second test was the "river water test." These tests and the results obtained therefrom are described below.

The activated sludge test is carried out by contacting the test compounds with a sludge obtained from an activated sludge sewage disposal plant in the following manner. Approximately 1500 mls. of the sludge was maintained at room temperature and normal room lighting conditions in a 2 liter graduate while under constant agitation by a stream of air introduced near the bottom of the graduate for approximately 23 hours. The sludge was allowed to settle for one hour and then 1000 mls. of the supernatant liquor was withdrawn and replaced by one liter of tap water containing 25 milligrams of test compound, 150 mgs. of glucose, 159 mgs. of nutrient broth, 150 mgs. of sodium benzoate, 150 mgs. dipotassium hydrogen phosphate and 25 mgs. ammonium sulfate. The aeration was then continued for the next 23 hours and once more allowed to settle and then 1000 mls. of the supernatant liquid decanted. The decanted liquid is analyzed for test compound by the Longwell-Maniece modification of the methylene blue method as described in The Analyst, vol. 82, 826–827 (1957). The amount of test alkylbenzene sulfonate in the decanted effluent was subtracted from the amount initially added to obtain the amount of test material which had biodegraded. From this the percent biodegradation of the test compounds was obtained. For greater accuracy in this procedure, the tests were repeated over and over until a constant percent biodegradation was obtained for each test compound. The results of the tests are given in the following table wherein alkylbenzene sulfonate A is one prepared from the $C_{12}$ dimer product of the example and alkylbenzene sulfonate B is the conventional propylene tetramer derived alkylbenzene sulfonate.

| | Percent biodegradable |
|---|---|
| Alkylbenzene sulfonate A | 96 |
| Alkylbenzene sulfonate B | 62 |

The second test used, the river water test, is a comparative test and as such is indicative of the relative rates of biological decomposition of any number of different compounds being tested. The specific river water used is not critical, but due to the variance of type of bacteria in river water and the day-to-day differences in bacterial concentration, portions of the same river water should be used for all comparison tests. The river water test comprises mixing 5 to 10 parts per million of alkylbenzene sulfonates with a very dilute culture of soil organisms contained in a sample of river water, and then periodically determining the alkylbenzene sulfonate content of the river water. The concentration of alkylbenzene sulfonate in the river water is determined by the methylene blue test, which comprises introducing methylene blue into a sample of the alkylbenzene sulfonate containing river water, thereby producing a salt of the alkylbenzene sulfonate with the methylene blue. This salt is then extracted with an organic solvent such as chloroform and the solution color measured. The methylene blue analysis used herein is described in The Analyst, vol. 62, 826–827 (1957). The rate and amount of the reduction of concentration of alkylbenzene sulfonate in the mixture is a comparative measure of its susceptibility or, conversely, resistance to bacterial attack.

A sample of river water was obtained and separated into two equal portions, each in a separate vessel. To one of these portions was added an amount of the alkylbenzene sulfonate A from the $C_{12}$ dimer prepared in accordance with the present invention sufficient to bring about a concentration of 7.0 parts per million of the alkylbenzene sulfonate in the river water. To the other portion of the river water was added alkylbenzene sulfonate B prepared from the propylene tetramer obtained from the conventional phosphoric acid polymerization of propylene. The amount of this conventional dodecylbenzene sulfonate added was sufficient to bring about a concentration of 8.4 parts per million of the conventional dodecylbenzene sulfonate in the river water. The concentration of the alkylbenzene sulfonates in the river water was then determined at 0, 10, 20 and 28 days. The following table summarizes the data thus obtained.

| | Concentration in p.p.m. | | | |
|---|---|---|---|---|
| | 0 days | 10 days | 20 days | 28 days |
| Alkylbenzene Sulfonate A | 6.7 | 1.7 | 0.2 | 0.1 |
| Alkylbenzene Sulfonate B | 8.7 | 5.5 | 2.2 | 2.2 |

What is claimed is:
1. A process for preparing an olefin fraction suitable for the preparation of biodegradable alkyl aromatic compounds, said process comprising contacting in a first polymerization zone normally gaseous alpha mono-olefin hydrocarbons at a temperature of 0 to 200° C. and a pressure of atmospheric to 2500 p.s.i.g. with an activated carbon supported cobalt oxide catalyst activated at a temperature of 200 to 350° C. to form a polymer fraction, separating said polymer fraction to obtain a fraction comprised of relatively linear dimers of the normally gaseous mono-olefin hydrocarbons, said dimers being of 4 to 8 carbon atoms, contacting said relatively linear dimer fraction in a second polymerization zone at a temperature of 50 to 250° C. and a pressure of atmospheric to 2500 p.s.i.g. with an activated carbon supported cobalt oxide catalyst activated at a temperature of 400 to 575° C. to form a second polymer fraction, separating said second polymer fraction to obtain a fraction comprised of relatively linear mono-olefin dimers of 8 to 16 carbon atoms, said relatively linear mono-olefin dimers being suitable for the preparation of biodegradable alkyl aromatic compounds.

2. The process of claim 1 wherein the first catalyst is activated at a temperature of 225 to 300° C. and the second catalyst is activated at a temperature of 425 to 525° C.

3. The process of claim 1 wherein the normally gaseous alpha mono-olefin is propylene.

4. The process of claim 1 wherein the first polymerization zone is maintained at a temperature of 50 to 150° C. and a pressure of 50 to 750 p.s.i.g. and wherein the second polymerization zone is maintained at a temperature of 100 to 175° C. and a pressure of 10 to 400 p.s.i.g.

5. The process of claim 1 wherein both catalysts are activated in a non-oxidizing atmosphere.

6. The process of claim 5 wherein the non-oxidizing atmosphere is selected from the group consisting of nitrogen, propane, carbon dioxide, helium, argon, and mixtures thereof.

7. The process of claim 6 wherein the non-oxidizing atmosphere is nitrogen.

8. The process of claim 1 wherein the relatively linear dimer contacted in the second polymerization zone contains no greater than 15% by weight of branched-chain dimers.

9. The process of claim 1 wherein the first polymerization zone is maintained at a temperature of 50 to 150° C. and a pressure of 100 to 750 p.s.i.g., and wherein the second polymerization zone is maintained at a temperature of 100 to 175° C. and a pressure of 100 to 300 p.s.i.g.

References Cited by the Examiner

UNITED STATES PATENTS

| 2,318,719 | 5/1943 | Schneider et al. | 260—683.15 |
| 2,599,249 | 6/1952 | Friedman | 260—683.15 |
| 2,688,646 | 9/1954 | Russell | 260—683.15 |
| 2,692,295 | 10/1954 | Peters | 260—683.15 |
| 3,137,739 | 6/1964 | Paulis et al. | 260—683.15 |

OTHER REFERENCES

Mellor: Comprehensive Treatise on Inorganic and Theoretical Chemistry, vol. 14, Longmans, Green and Co., N.Y., 1935, pages 584–586.

DELBERT E. GANTZ, *Primary Examiner.*

R H. SHUBERT, *Assistant Examiner.*